United States Patent
Blanch (10) Patent No.: US 7,607,407 B1
(45) Date of Patent: Oct. 27, 2009

(54) ANIMAL CHASTITY DEVICE

(76) Inventor: Dexter L. Blanch, 6101 Yarbrough Rd., Shreveport, LA (US) 71119

( * ) Notice: Subject to any disclaimer, the term of this patent is extended or adjusted under 35 U.S.C. 154(b) by 117 days.

(21) Appl. No.: 12/006,458

(22) Filed: Dec. 31, 2007

Related U.S. Application Data (60) Provisional application No. 60/885,435, filed on Jan. 18, 2007.

(51) Int. Cl.
*A01K 29/00* (2006.01)
(52) U.S. Cl. ..................................... 119/868
(58) Field of Classification Search ............. 119/850, 119/856, 858–860, 867–869, 809, 838; 54/79.1, 54/79.2, 79.4; D30/144, 145; 604/385.09, 604/385.19, 385.11, 393
See application file for complete search history.

(56) References Cited

U.S. PATENT DOCUMENTS

| | | | | |
|---|---|---|---|---|
| 2,190,115 A | * | 2/1940 | Fuqua | 119/854 |
| 3,817,217 A | * | 6/1974 | Matuka et al. | 119/868 |
| 4,444,152 A | * | 4/1984 | Berardo | 119/868 |
| 4,510,887 A | * | 4/1985 | Lincoln et al. | 119/868 |
| 4,969,419 A | * | 11/1990 | Fong | 119/868 |
| 5,355,836 A | * | 10/1994 | Vallery | 119/868 |
| 5,819,691 A | * | 10/1998 | Lavi et al. | 119/868 |
| 6,457,440 B1 | * | 10/2002 | Liburd | 119/868 |
| 6,494,168 B2 | * | 12/2002 | Weng | 119/868 |
| 6,647,928 B1 | * | 11/2003 | Spiller | 119/854 |
| 6,837,187 B2 | * | 1/2005 | Berardo | 119/792 |
| 7,461,616 B2 | * | 12/2008 | Tsai | 119/868 |

* cited by examiner

*Primary Examiner*—Thomas Price
(74) *Attorney, Agent, or Firm*—R. Keith Harrison (57) ABSTRACT

An animal chastity device. One illustrative embodiment of the animal chastity device includes a fastening device and a barrier harness detachably fastened to the fastening device. The barrier harness includes a rear fastening strap detachably fastened to the fastening device, a barrier panel carried by the rear fastening strap and a center fastening strap extending from the barrier panel and detachably fastened to the fastening device. A bite-repelling mechanism may be provided in at least one of the fastening device and the barrier harness.

20 Claims, 5 Drawing Sheets

ANIMAL CHASTITY DEVICE

CROSS-REFERENCE TO RELATED APPLICATIONS

This application claims the benefit of and incorporates by reference in its entirety U.S. Provisional patent application No. 60/885,435, filed Jan. 18, 2007 and entitled "Pet Chastity Device".

The present disclosure relates to an animal chastity device. More particularly, the present disclosure relates to an animal chastity device which is fastened on a female animal to prevent a male animal from engaging in the breeding process with the female animal.

BACKGROUND

It is frequently desirable to prevent animals from engaging in breeding or to prevent pregnancy which may result from breeding. One of the most common methods of preventing pregnancy in animals, particularly pets, is the spaying or ovarihysterectomy (removal of uterus and ovaries) of a female and neutering or castration (removal of the testicles) of a male animal. However, these methods result in the permanent inability of the female animal to become pregnant or the male animal to impregnate a female animal. Under some circumstances, it may be desirable to prevent breeding between animals for a period of time, after which impregnation of the female animal may be desired.

SUMMARY

The present disclosure is generally directed to an animal chastity device. One illustrative embodiment of the animal chastity device includes a fastening device and a barrier harness detachably fastened to the fastening device. The barrier harness includes a rear fastening strap detachably fastened to the fastening device, a barrier panel carried by the rear fastening strap and a center fastening strap extending from the barrier panel and detachably fastened to the fastening device.

DETAILED DESCRIPTION

Referring initially to FIGS. 1-3A of the drawings, an illustrative embodiment of the animal chastity device is generally indicated by reference numeral 1. The animal chastity device 1 includes a fastening device 11 (FIG. 1) and a barrier harness 19 (FIG. 2) which are fastened on a female animal 54 (FIG. 3A) to cover the genital area (not illustrated) of the female animal 54 and therefore, prevent breeding of the female animal 54 with a male animal (not illustrated). As will be hereinafter described, in typical application the fastening device 11 is fastened around the midsection 55 of the animal 54. The barrier harness 19 placed on the hindsection 56 of the animal 54, covering the genital area of the animal 54, and is attached to the fastening device 11. The various embodiments of the animal chastity device as described herein below are applicable to large and small domestic and exotic animals.

Figure 1:
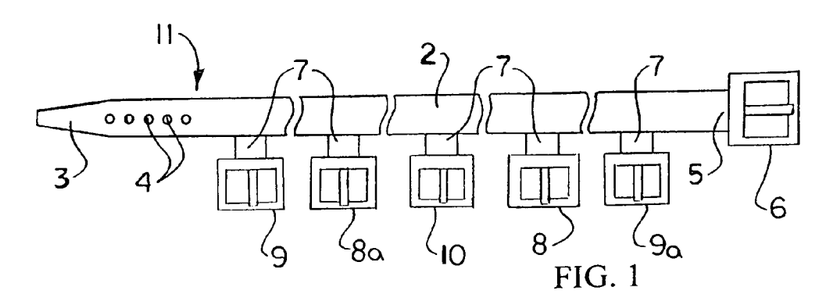
FIG. 1 is a side view, partially in section, of a fastening device element of an illustrative embodiment of the animal chastity device, illustrated in an unfastened state.

As illustrated in FIG. 1, the fastening device 11 of the animal chastity device 1 includes a generally elongated, flexible main fastening strap 2. The main fastening strap 2 may be a durable material such as leather, fabric or nylon, in non-exclusive particular. The main fastening strap 2 has a first main fastening strap end 3, which in some embodiments has multiple buckle openings 4, and a second main fastening strap end 5. A main fastening strap buckle 6 is provided on the second main fastening strap end 5 of the main fastening strap 2. The main fastening strap buckle 6 is adapted to receive the first main fastening strap end 3 and engage one of the buckle openings 4 to fasten the fastening device 11 around the midsection 55 of the animal 54, as will be hereinafter described. However, alternative fastening mechanisms which are known by those skilled in the art may be used to fasten the first main fastening strap end 3 to the second main fastening strap end 5 of the main fastening strap 2.

The barrier harness 19 is adapted for detachable fastening to the fastening device 11 of the chastity device 1 using any suitable fastening technique which is known by those skilled in the art. As further illustrated in FIG. 1, in some embodiments multiple buckle straps 7 extend from the main fastening strap 2 in generally spaced-apart, adjacent relationship with respect to each other. Each buckle strap 7 may be oriented in generally perpendicular relationship with respect to the longitudinal axis of the main fastening strap 2. Multiple buckles may be provided on the respective buckle straps 7. The buckles may include, for example, a center buckle 10; a pair of first and second inside buckles 8, 8a on respective sides of the center buckle 10; and a pair of first and second outside buckles 9, 9a on respective sides of the inside buckles 8a, 8a provided on the respective buckle straps 7. The center buckle 10; the first and second inside buckles 8, 8a; and the first and second outside buckles 9, 9a are adapted for detachable attachment to respective structural elements of the barrier harness 19, as will be hereinafter described.

Figure 2:
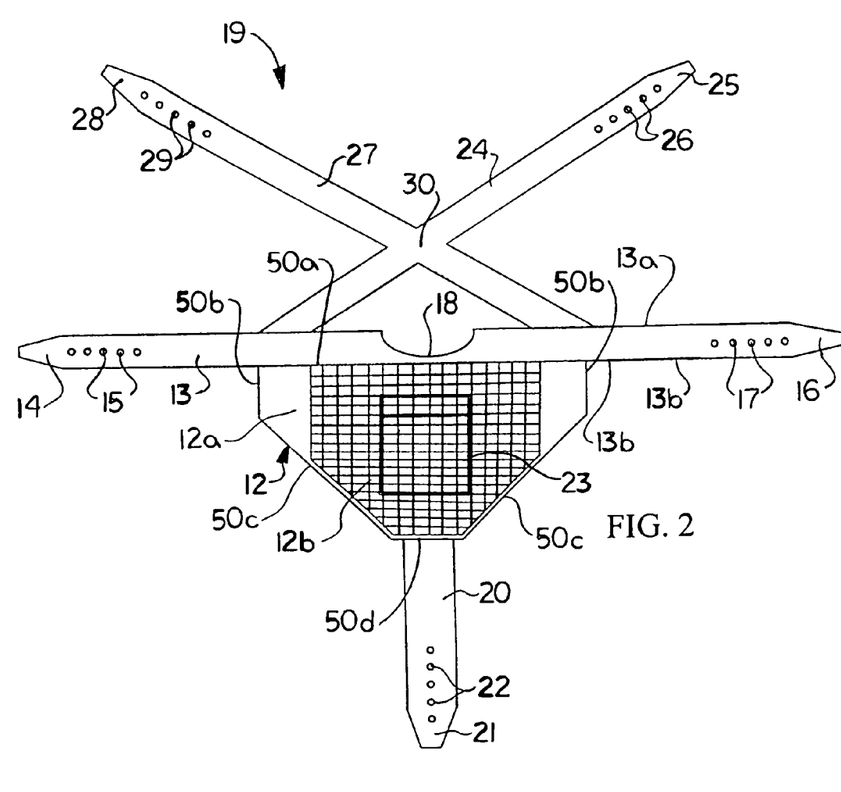
FIG. 2 is a rear view of a barrier harness element of an illustrative embodiment of the animal chastity device, illustrated in an unfastened state.
Figure 3:
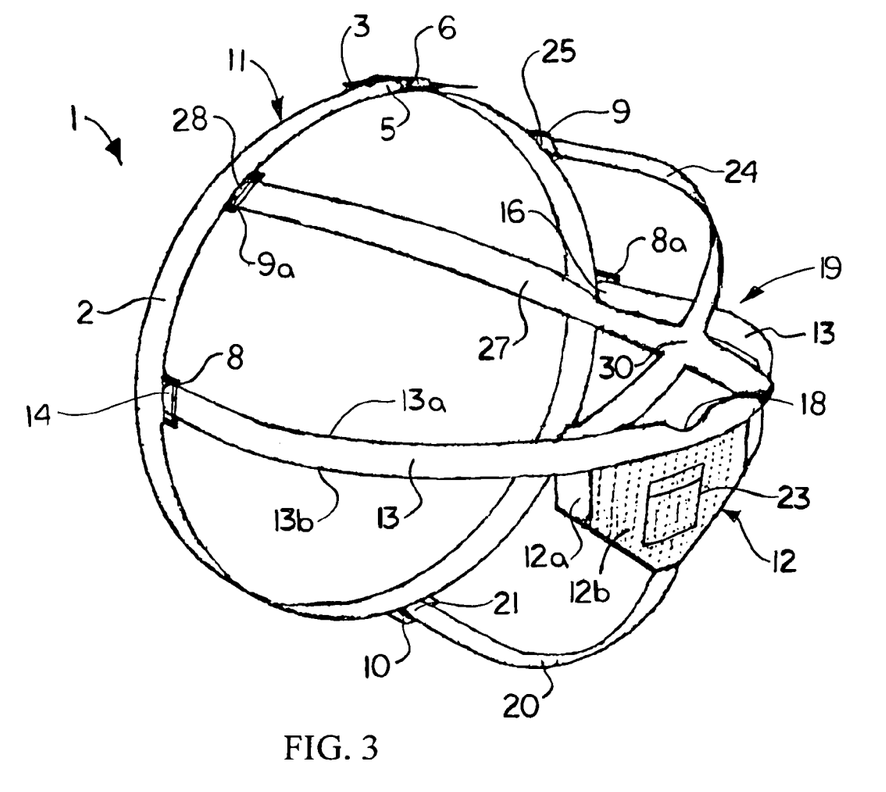
FIG. 3 is a rear perspective view of an illustrative embodiment of the animal chastity device, with the fastening device and barrier harness illustrated in a fastened state.

As illustrated in FIG. 2, the barrier harness 19 of the animal chastity device 1 includes a generally elongated, flexible rear fastening strap 13 having a first strap edge 13a and a second strap edge 13b. The rear fastening strap 13 and other components of the barrier harness 19, unless otherwise noted, may be a durable material such as leather; fabric; or nylon, in non-exclusive particular. The rear fastening strap 13 has a first rear fastening strap end 14 which in some embodiments includes a first set of multiple buckle openings 15. The rear fastening strap 13 also has a second rear fastening strap end 16 which in some embodiments has a second set of buckle openings 17. A strap notch 18 may be provided in the first strap edge 13a of the rear fastening strap 13, generally equidistant between the first rear fastening strap end 14 and the second rear fastening strap end 16. As illustrated in FIG. 3, in typical use of the animal chastity device 1, which will be hereinafter described, the first rear fastening strap end 14 and the second rear fastening strap end 16 of the rear fastening strap 13 are fastened to the fastening device 11 such as via the first inside buckle 8 and the second inside buckle 8a, respectively, for example, of the fastening device 11.

As further illustrated in FIG. 2, an elongated, flexible first cross strap 24 and an elongated, flexible second cross strap 27 extend from the first strap edge 13a of the rear fastening strap 13 on respective sides of the strap notch 18. The first cross strap 24 and the second cross strap 27 intersect each other at a cross strap junction 30. The first cross strap 24 has a first cross strap end 25 which in some embodiments includes multiple buckle openings 26. The second cross strap 27 has a second cross strap end 28 which in some embodiments includes multiple buckle openings 29. As illustrated in FIG. 3, the first cross strap end 25 of the first cross strap 24 is adapted for fastening to the inside buckle 9, whereas the second cross strap end 28 of the second cross strap 27 is adapted for fastening to the inside buckle 9a, of the fastening device 11. Alternative fastening mechanisms which are known by those skilled in the art can be used to attach the first cross strap 24 and the second cross strap 27 to the main fastening strap 2 of the fastening device 11.

As further illustrated in FIG. 2, a barrier panel 12 is provided on the rear fastening strap 13. In some embodiments, the barrier panel 12 includes a flexible barrier panel frame 12a which extends from the second strap edge 13b of the rear fastening strap 13. A barrier panel mesh 12b spans the barrier panel frame 12a. The barrier panel frame 12a and the barrier panel mesh 12b may be nylon or any suitable alternative durable and flexible material. In other embodiments, a solid barrier panel sheet (not illustrated) spans the barrier panel frame 12a. The barrier panel frame 12a may have an attachment frame edge 50a which is attached to the second strap edge 13b of the rear fastening strap 13 according to the knowledge of those skilled in the art; a pair of spaced-apart, parallel side frame edges 50b which extend from the attachment frame edge 50a; a pair of angled frame edges 50c which extend toward each other from the respective side frame edges 50b; and a strap frame edge 50d which extends between the angled frame edges 50c in generally parallel relationship with respect to the attachment frame edge 50a. In some embodiments, a pocket 23 is provided on the barrier panel mesh 12b of the barrier panel 12.

An elongated, flexible center fastening strap 20 extends from the strap frame edge 50d of the barrier panel frame 12a of the barrier panel 12. The center fastening strap 20 has a center fastening strap end 21 which in some embodiments includes multiple buckle openings 22. As illustrated in FIG. 3, the center fastening strap end 21 of the center hastening strap 20 may be adapted for fastening to the center buckle 10 of the fastening device 11. Alternative fastening mechanisms which are known by those skilled in the art can be used to fasten the center fastening strap 20 to the fastening device 11.

Figure 3A:
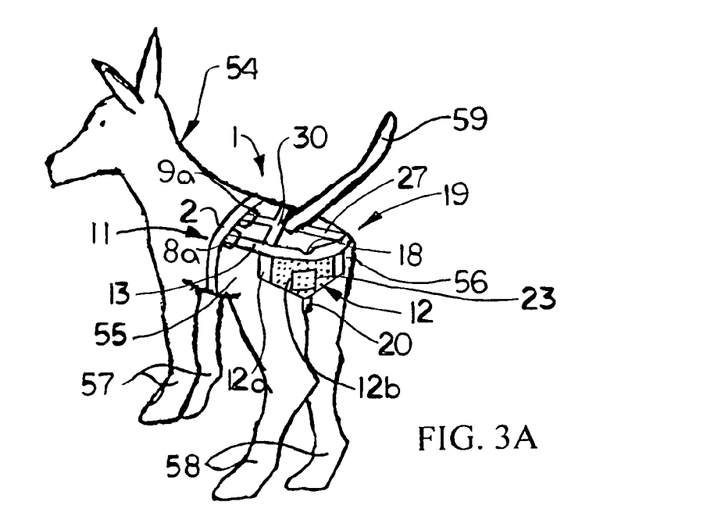
FIG. 3A is a rear perspective view of an illustrative embodiment of the animal chastity device, fastened on a female animal in typical application of the device.

As illustrated in FIGS. 3 and 3A, in typical application the animal chastity device 1 is fastened on a female animal 54 (FIG. 3A) such as a dog, for example, to cover the genital area of the female animal 54 and prevent breeding of a male animal (not illustrated) with the female animal 54. The female animal 54 may be any type of large or small domestic or exotic animal. Accordingly, the fastening device 11 is initially fastened around the midsection 55 of the animal 54, typically behind the front legs 57 of the animal 54. This is accomplished by extending the main fastening strap 2 around the midsection 55 of the animal 54 and typically fastening the first main fastening strap end 3 to the main fastening strap buckle 6 of the fastening device 11. The diameter of the fastening device 11 can be selected according to the buckle openings 4, depending on the girth of the midsection 55 of the animal 54. When the fastening device 11 is fastened around the animal 54, the buckle straps 7 (FIG. 1) extend rearwardly from the main fastening strap 2 toward the hindsection 56 of the animal 54.

The barrier harness 19 is then placed on the hindsection 56 of the animal 54 and fastened to the fastening device 11. Accordingly, the barrier panel 12 of the barrier harness 19 is placed against the genital area (not illustrated) and covers the vaginal opening (not illustrated) of the animal 54. The strap notch 18 in the first strap edge 13a of the rear fastening strap 13 is located beneath the anus (not illustrated) and urethra (not illustrated) of the animal 54 to facilitate defecation and urination of the animal 54 in an unobstructed manner. Fastening of the barrier harness 19 on the hindsection 56 of the animal 54 may be facilitated by extending the rear fastening strap 13 forwardly against the respective sides of the hindsection 56 of the animal 54. The first rear fastening strap end 14 and the second rear fastening strap end 16 are typically fastened to the first inside buckle 8 and the second inside buckle 8a, respectively, of the fastening device 11. The first cross strap 24 and the second cross strap 27 of the barrier harness 19 are extended over the upper portion of the hindsection 56 and midsection 55 of the animal 54, with the cross strap junction 30 typically positioned forwardly of the tail 59 of the animal 54. The first cross strap end 25 of the first cross strap 24 is typically fastened to the first outside buckle 9, whereas the second cross strap end 28 of the second cross strap 27 is typically fastened to the second outside buckle 9a, of the fastening device 11.

The center fastening strap 20 of the barrier harness 19 is extended between the rear legs 58 and forwardly along the abdomen of the animal 54. The center fastening strap end 21 of the center fastening strap 20 may be fastened to the center buckle 10 of the fastening device 11. Therefore, the fastening device 11 and the barrier harness 19 remain in place on the animal 54, as illustrated, in FIG. 3A, whether the animal 54 walks or stands still, and the barrier panel 12 covers the genital area of the animal 54. This prevents a male animal (not illustrated) from mounting and breeding with the female animal 54 since the vagina (not illustrated) of the female animal 54 continually remains covered by the barrier panel 12. Napkins (not illustrated) and/or other items may be placed in the pocket 23 which is provided on the barrier panel 12 of the barrier harness 19. The animal chastening device 1 can be removed from the animal 54, as desired, typically by initially unfastening the barrier harness 19 from the fastening device 11; removing the barrier harness 19 from the hindsection 56 of the animal 54; and unfastening and removing the fastening device 11 from the midsection 55 of the animal 54.

Figure 4:
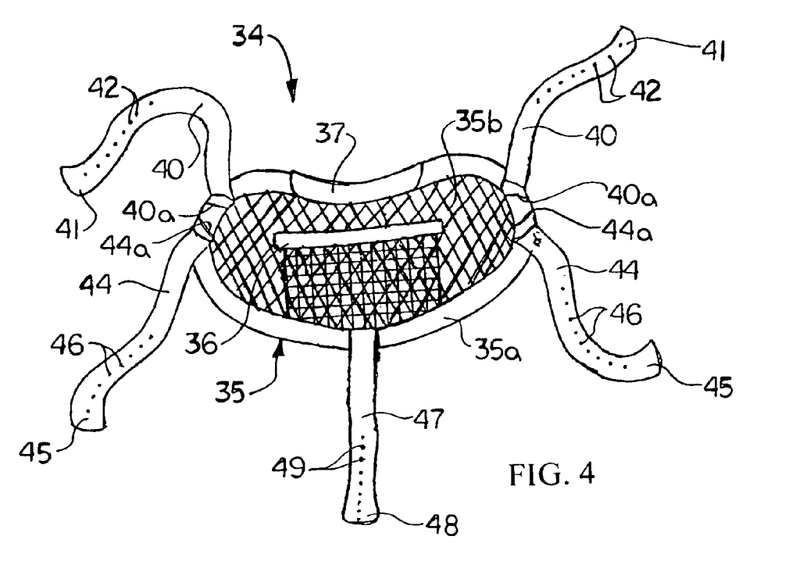
FIG. 4 is a rear view of a barrier harness element of an alternative illustrative embodiment of the animal chastity device, illustrated in an unfastened state.
Figure 5:
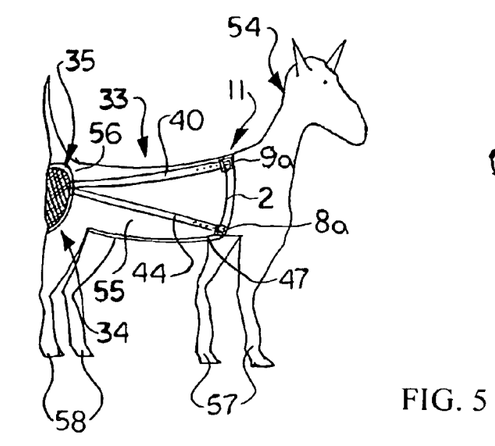
FIG. 5 is a side view of the alternative illustrative embodiment of the animal chastity device, fastened on a female animal in typical application of the device.
Figure 6:
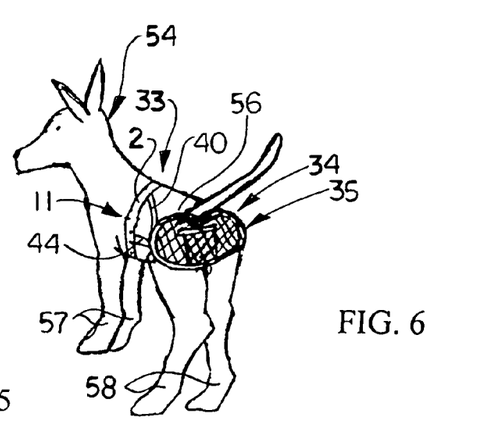
FIG. 6 is a rear perspective view of the alternative illustrative embodiment of the animal chastity device, fastened on a female animal in typical application of the device.

Referring next to FIGS. 4-6 of the drawings, an alternative illustrative embodiment of the animal chastity device is generally indicated by reference numeral 33 in FIGS. 5 and 6. The animal chastity device 33 includes a fastening device 11 which may have the same design and construction as the fastening device 11 which was heretofore described with respect to FIG. 1. The animal chastity device 33 further includes a barrier harness 34 which in application of the animal chastity device 33 is fastened to the fastening device 11, typically in a manner which will be hereinafter described, and covers the genital area of a female animal 54, which may be a large or small domestic or exotic animal, to prevent breeding of a male animal (not illustrated) with the animal 54.

As illustrated in FIG. 4, the barrier harness 34 of the animal chastity device 33 includes a barrier panel 35 which may have a generally elongated, elliptical, U-shaped configuration. The barrier panel 35 may include a flexible barrier panel frame 35a and a barrier panel mesh 35b which spans the barrier panel frame 35a. The barrier panel frame 35a and the barrier panel mesh 35b may be nylon or any suitable alternative durable and flexible material. In other embodiments, a solid barrier panel sheet (not illustrated) spans the barrier panel frame 35b. In some embodiments, a pocket 36 is provided on the barrier panel mesh 35b of the barrier panel 35. A frame notch 37 may be provided in the barrier panel frame 35a.

A pair of generally elongated upper side fastening straps 40 extends from the barrier panel frame 35a of the barrier panel 35 at opposite ends thereof. A pair of generally elongated lower side fastening straps 44 also extends from the barrier panel frame 35a at opposite ends thereof. At each end of the barrier panel frame 35a, the attachment point 40a of each upper side fastening strap 40 may be generally adjacent to the attachment point 44a of the corresponding lower side fastening strap 44. The upper side fastening straps 40 and the lower side fastening straps 44 at each end of the barrier panel frame 35a extend in opposite directions from each other. Each upper side fastening strap 40 has an upper side fastening strap end 41, whereas each lower side fastening strap 44 has a lower side fastening strap end 45. In some embodiments, multiple buckle openings 42 are provided in each upper side fastening strap 40 and multiple buckle openings 46 are provided in each lower side fastening strap 44. Each upper side fastening strap 40 of the barrier harness 34 is typically adapted for attachment to the respective first and second outside buckles 9 and 9a, respectively, of the fastening device 11. Each lower side fastening strap 44 of the barrier harness 34 is typically adapted for attachment to the respective first and second inside buckles 8, 8a, respectively, of the fastening device 11.

A generally elongated, flexible center fastening strap 47 extends from the barrier panel frame 35a, generally between the lower side fastening straps 44. The center fastening strap 47 has a bottom fastening strap end 48. In some embodiments, multiple buckle openings 49 are provided in the center fastening strap 47. The center fastening strap 47 is typically adapted for attachment to the center buckle 10 (FIG. 1) of the fastening device 11.

As illustrated in FIGS. 5 and 6, in typical application the animal chastity device 33 is fastened on a female animal 54 such as a dog, for example, to cover the genital area (not illustrated) of the animal 54 and prevent breeding of a male animal (not illustrated) with the animal 54. Accordingly, the fastening device 11 (FIG. 1) is initially fastened around the midsection 55 of the animal 54, typically behind the front legs 57 of the animal 54. This is accomplished by extending the main fastening strap 2 of the fastening device 11 around the midsection 55 of the animal 54 and typically fastening the first main fastening strap end 3 to the main fastening strap buckle 6 of the fastening device 11, as was heretofore described with respect to the animal chastity device 1 illustrated in FIGS. 1-3A.

The barrier harness 34 is then placed on the hindsection 56 of the animal 54 and fastened to the fastening device 11. Accordingly, the barrier panel 35 of the barrier harness 34 is placed against the genital area (not illustrated) and covers the vaginal opening (not illustrated) of the animal 54. The frame notch 37 (FIG. 4) in the barrier panel frame 35a is located beneath the anus (not illustrated) and urethra (not illustrated) of the animal 54 to facilitate defecation and urination of the animal 54 in an unobstructed manner. Fastening of the barrier harness 34 on the hindsection 56 of the animal 54 may be facilitated by extending the upper side fastening straps 40 and the lower side fastening straps 44 forwardly against the respective sides of the hindsection 56 and midsection 55 of the animal 54. The upper side fastening straps 40 are typically fastened to the first and second inside buckles 9 and 9a, respectively, of the fastening device 11. The lower side fastening straps 44 are typically fastened to the first and second outside buckles 8 and 8a, respectively, of the fastening device 11, as illustrated in FIG. 5.

The center fastening strap 47 of the barrier harness 34 is extended between the rear legs 58 and forwardly along the abdomen of the animal 54, as illustrated in FIG. 5. The center fastening strap 47 is typically fastened to the center buckle 10 (FIG. 1) of the fastening device 11. Therefore, the fastening device 11 and the barrier harness 34 remain in place on the animal 54, as illustrated, in FIGS. 5 and 6, whether the animal 54 walks or stands still, and the barrier panel 35 covers the genital area of the animal 54. This prevents a male animal (not illustrated) from mounting and breeding with the female animal 54 since the vagina (not illustrated) of the female animal 54 continually remains covered by the barrier panel 35. Napkins (not illustrated) and/or other items may be placed in the pocket 36 which is provided on the barrier panel 35 of the barrier harness 34. The animal chastening device 33 can be removed from the animal 54, as desired, typically by initially unfastening the barrier harness 34 from the fastening device 11; removing the barrier harness 34 from the hindsection 56 of the animal 54; and unfastening and removing the fastening device 11 from the midsection 55 of the animal 54.

Figure 7:
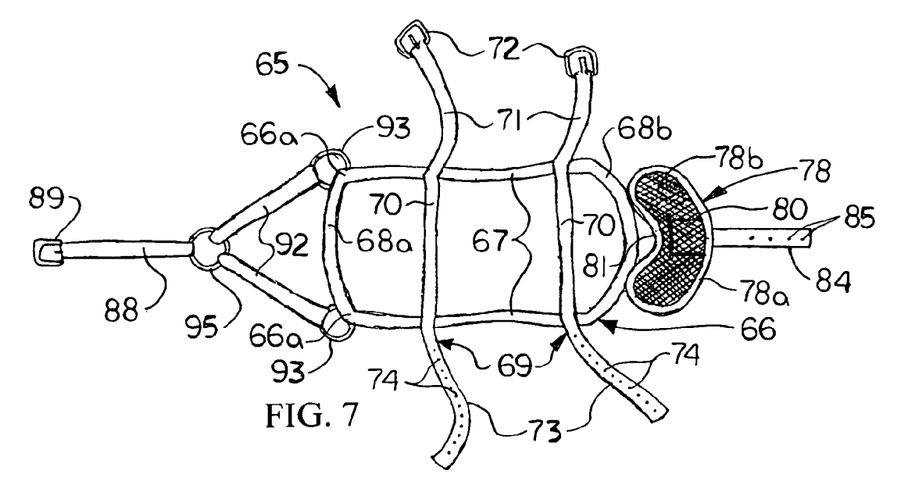
FIG. 7 is a top view of another alternative illustrative embodiment of the animal chastity device, illustrated in an unfastened state.
Figure 8:
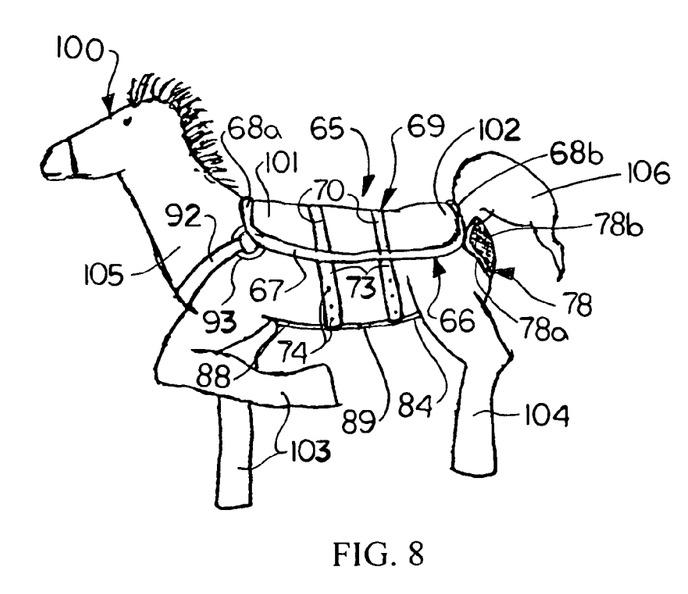
FIG. 8 is a side view of the illustrative embodiment of the animal chastity device illustrated in FIG. 7, fastened on a female animal in typical application of the device.

Referring next to FIGS. 7 and 8 of the drawings, another alternative illustrative embodiment of the animal chastity device is generally indicated by reference numeral 65. The animal chastity device 65 is adapted to be fastened on a female animal 100 such as a horse, for example, or any type of large or small domestic or exotic animal to prevent a male animal (not illustrated) from breeding with the female animal 100. As illustrated in FIG. 7, the animal chastity device 65 includes a generally rectangular body harness 66 having a pair of generally elongated, parallel, spaced-apart, flexible longitudinal harness straps 67. A pair of generally elongated, parallel, spaced-apart, flexible transverse harness straps 68 extends between the longitudinal harness straps 67 at respective ends thereof. The transverse harness straps 68 may include a front transverse harness strap 68a and a rear transverse harness strap 68b.

A pair of generally elongated, parallel, spaced-apart, flexible body fastening straps 69 intersects the longitudinal harness straps 67. Each body fastening strap 69 includes a spanning strap segment 70 which extends between the longitudinal harness straps 67, a buckle strap segment 71 which extends from a first end of the spanning strap segment 70 and a fastening segment 73 which extends from a second end of the spanning strap segment 70. In some embodiments, a buckle 72 is provided on the buckle strap segment 71 of each body fastening strap 69. Multiple buckle openings 74 may be provided in the fastening segment 73 of each body fastening strap 69. Accordingly, in typical fastening of the animal chastity device 65 on the animal 100, which will be hereinafter described, the fastening segments 73 are fastened to the buckles 72 on the buckle strap segments 71 of the respective body fastening straps 69. However, any type of alternative fastening mechanism which is known by those skilled in the art may be used to fasten the fastening segments 73 to the buckle strap segments 71 of the respective body fastening straps 69.

A barrier panel 78 is provided on the rear transverse harness strap 68b of the body harness 66. The barrier panel 78 may have a generally elongated, elliptical, U-shaped configuration. The barrier panel 78 may include a flexible barrier panel frame 78a and a barrier panel mesh 78b which spans the barrier panel frame 78a. The barrier panel frame 78a and the barrier panel mesh 78b of the barrier panel 78 may be nylon or any suitable alternative durable and flexible material. In other embodiments, a solid barrier panel sheet (not illustrated) spans the barrier panel frame 78a. In some embodiments, a pocket 80 is provided on the barrier panel mesh 78b of the barrier panel 78. As illustrated in FIG. 7, a frame notch 81 may be provided in the barrier panel frame 78a. A center fastening strap 84 extends from the barrier panel frame 78a of the barrier panel 78.

As further illustrated in FIG. 7, a generally elongated, flexible front fastening strap 88 is attached to the body harness 66. The front fastening strap 88 is adapted for detachable attachment to the center fastening strap 84 which extends from the barrier panel 78. In some embodiments, a buckle 89 is provided on the front fastening strap 88. Multiple buckle openings 85 may be provided in the center fastening strap 84. Accordingly, the buckle 89 receives the center fastening strap 84 and engages one of the buckle openings 85 therein to fasten the center fastening strap 84 to the front fastening strap 88. Any type of alternative fastening mechanism which is known by those skilled in the art may be used to fasten the center fastening strap 84 to the front fastening strap 88.

The front fastening strap 88 may be attached to the front transverse harness strap 68a of the body harness 66 using any suitable technique which is known by those skilled in the art. As illustrated in FIG. 7, in some embodiments a pair of generally elongated, flexible neck straps 92 extends from the front transverse harness strap 68a and the front fastening strap 88 extends from the neck straps 92. Each neck strap 92 may be attached to a corresponding front corner 66a of the body harness 66 via a corresponding neck strap attachment ring 93, for example. The front fastening strap 88 may be attached to the neck straps 92 via a front strap attachment ring 95, for example. Accordingly, the neck straps 92 converge from the body harness 66 onto the front strap attachment ring 95.

As illustrated in FIG. 8, in typical application the animal chastity device 65 is fastened on a female animal 100 such as a horse, for example, to cover the genital area (not illustrated) of the animal 100 and prevent breeding of a male animal (not illustrated) with the animal 100. Accordingly, the body harness 66 is initially laid across the back of the animal 100, with the front transverse harness strap 68a of the body harness 66 behind the neck 105 and the rear transverse harness strap 68b of the body harness 66 in front of the tail 106 of the animal 100. The buckle strap segments 71 and the fastening segments 73 of the respective body fastening straps 69 are extended downwardly against the respective sides and bottom of the midsection 101 of the animal 100. The fastening segments 73 are fastened to the respective buckle strap segments 71 typically via the buckles 72. The barrier panel 78 is extended over the vaginal opening (not illustrated) in the hindsection 102 of the animal 100, after which the center fastening strap 84 is extended between the rear legs 104 of the animal 100. The front fastening strap 88 is extended between the front legs 103 of the animal 100 and fastened to the center fastening strap 84 typically via the buckle 89 (FIG. 7). The neck straps 92 extend on opposite sides of the neck 105 of the animal 100. Therefore, the barrier panel 78 covers the genital area of the animal 100 and prevents a male animal (not illustrated) from mounting and breeding with the female animal 100. Napkins (not illustrated) and/or other items may be placed in the pocket 80 which is provided on the barrier panel 78. The animal chastening device 65 can be removed from the animal 100, as desired, typically by initially unfastening the body fastening straps 69 and unfastening the center fastening strap 84 from the front fastening strap 88 and removing the body harness 66 from the midsection 101 of the animal 100.

Figure 9:
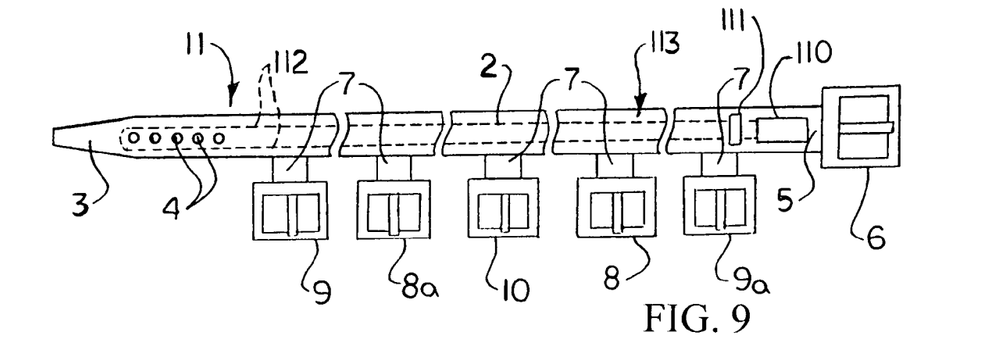
FIG. 9 is a side view, partially in section, of a fastening device element of an illustrative embodiment of the animal chastity device, illustrated in an unfastened state, more particularly illustrating a bite-repelling mechanism provided in the fastening device.

Referring next to FIG. 9 of the drawings, in some embodiments of the animal chastity device 1, the fastening device 11 is fitted with a bite-repelling mechanism 113 to prevent the animal (not illustrated) on which the animal chastity device 1 is fastened from chewing the fastening device 11. The bite-repelling mechanism 113 may include, for example, a battery 110 which may be a 9, 10 or 12-volt battery, for example. Wiring 112 (illustrated in phantom) connects the positive and negative terminals of the battery 110. The wiring 112 extends along the length of the main fastening strap 2 of the fastening device 11. A switch 111 may be provided in the wiring 112 to facilitate selectively establishing the flow of electrical current through the wiring 112. Accordingly, in the event that the animal (not illustrated) attempts to chew the main fastening strap 2, the electrical current which runs through the wiring 112 imparts a slight electrical shock to the mouth of the animal and prevents further biting and damage to the main fastening strap 2. The bite-repelling mechanism 113 may additionally or alternatively be provided on the barrier panel 12, the barrier harness 19, the rear fastening strap 13 (FIG. 2), the center fastening strap 20, the first cross strap 24, the second cross strap 27 and/or other components of the animal chastity device 1.

While the illustrative embodiments of the disclosure have been described above, it will be recognized and understood that various modifications can be made to the embodiments and the appended claims are intended to cover all such modifications which may fall within the spirit and scope of the disclosure.

Having described my invention with the particularity set forth above, I claim:

1. An animal chastity device, comprising:
   a fastening device;
   a barrier harness detachably fastened to said fastening device and comprising:
      a rear fastening strap detachably fastened to said fastening device;
      a barrier panel carried by said rear fastening strap;
      a center fastening strap carried by said barrier panel and detachably fastened to said fastening device; and
   a bite-repelling mechanism provided in at least one of said fastening device and said barrier harness.

2. The animal chastity device of claim 1 wherein said barrier panel comprises a barrier panel frame carried by said rear fastening strap and a barrier panel mesh carried by said barrier panel frame.

3. The animal chastity device of claim 2 wherein said barrier panel frame comprises an attachment frame edge carried by said rear fastening strap; a pair of generally spaced-apart, parallel side frame edges extending from said attachment frame edge; a pair of angled frame edges extending toward each other from said side frame edges, respectively; and a strap frame edge extending between said angled frame edges, and wherein said center fastening strap extends from said strap frame edge.

4. The animal chastity device of claim 2 further comprising a pocket provided on said barrier panel mesh of said barrier panel.

5. The animal chastity device of claim 1 wherein said fastening device comprises an elongated, flexible main fastening strap having a first main fastening strap end and a second main fastening strap end and a fastening mechanism provided on said second main fastening strap end and detachably receiving said first main fastening strap end.

6. The animal chastity device of claim 5 wherein said fastening mechanism comprises a main fastening strap buckle provided on said second main fastening strap end.

7. The animal chastity device of claim 5 further comprising a plurality of buckles carried by said main fastening strap and wherein said rear fastening strap and said center fastening strap of said barrier harness are detachably fastened to said plurality of buckles, respectively.

8. The animal chastity device of claim 7 further comprising a plurality of buckle straps carried by said main fastening strap of said fastening device and wherein said plurality of buckles is carried by said plurality of buckle straps, respectively.

9. The animal chastity device of claim 1 wherein said rear fastening strap of said barrier harness comprises a first strap edge and a second strap edge and said barrier panel extends from said second strap edge, and further comprising intersecting first and second cross straps carried by said first strap edge in spaced-apart relationship with respect to each other.

10. The animal chastity device of claim 9 further comprising a strap notch provided in said first strap edge of said rear fastening strap generally between said first and second cross straps.

11. The animal chastity device of claim 9 wherein said barrier panel comprises a barrier panel frame carried by said first strap edge of said rear fastening strap and a barrier panel mesh carried by said barrier panel frame and said barrier panel frame comprises an attachment frame edge carried by said rear fastening strap; a pair of generally spaced-apart, parallel side frame edges extending from said attachment frame edge; a pair of angled frame edges extending toward each other from said side frame edges, respectively; and a strap frame edge extending between said angled frame edges, and wherein said center fastening strap extends from said strap frame edge.

12. The animal chastity device of claim 11 further comprising a plurality of buckle straps extending from said main fastening strap of said fastening device and oriented in generally perpendicular relationship with respect to a longitudinal axis of said main fastening strap and a plurality of buckles carried by said plurality of buckle straps, respectively.

13. An animal chastity device, comprising:
a fastening device;
a barrier harness detachably fastened to said fastening device and comprising:
 a barrier panel;
 a pair of upper side fastening straps and a pair of lower side fastening straps carried by said barrier panel and detachably fastened to said fastening device;
 a center fastening strap carried by said barrier panel and detachably fastened to said fastening device; and
a bite-repelling mechanism provided in at least one of said fastening device and said barrier harness.

14. The animal chastity device of claim 13 wherein said barrier panel comprises a barrier panel frame having a generally elongated, elliptical, U-shaped configuration and a barrier panel mesh spanning said barrier panel frame.

15. The animal chastity device of claim 14 further comprising a pocket provided on said barrier panel mesh.

16. The animal chastity device of claim 14 wherein said fastening device comprises:
an elongated, flexible main fastening strap having a first main fastening strap end and a second main fastening strap end;
a plurality of buckle straps extending from said main fastening strap between said first main fastening strap end and said second main fastening strap end, each of said plurality of buckle straps oriented in generally perpendicular relationship with respect to a longitudinal axis of said main fastening strap;
a plurality of buckles carried by said plurality of buckle straps, respectively; and detachably fastened to said pair of upper side fastening straps, said pair of lower side fastening straps and said center fastening strap, respectively.

17. An animal chastity device, comprising:
a generally elongated body harness comprising:
 a pair of spaced-apart longitudinal harness straps;
 a pair of spaced-apart front and rear transverse harness straps extending between said longitudinal harness straps; and
 a pair of body fastening straps carried by said longitudinal harness straps;
a front fastening strap carried by said front transverse harness strap of said body harness;
a barrier panel carried by said rear transverse harness strap of said body harness; and
a center fastening strap carried by said barrier panel and detachably fastened to said front fastening strap; and
a bite-repelling mechanism provided in at least one of said body harness, said front fastening strap, said barrier panel and said center fastening strap.

18. The animal chastity device of claim 17 wherein said barrier panel comprises a barrier panel frame having a generally elongated, elliptical, U-shaped configuration carried by said rear transverse harness strap of said body harness and a barrier panel mesh spanning said barrier panel frame.

19. The animal chastity device of claim 17 further comprising a pair of neck straps extending from said body harness and wherein said front fastening strap extends from said pair of neck straps.

20. The animal chastity device of claim 17 wherein each of said pair of body fastening straps comprises a spanning strap segment extending between and intersecting said longitudinal harness straps of said body harness, a buckle strap segment extending from a first end of said spanning strap segment, a fastening segment extending from a second end of said spanning strap segment and a buckle provided on said buckle strap segment and adapted for detachable fastening to said fastening segment.

\* \* \* \* \*